(12) United States Patent
Mullen et al.

(10) Patent No.: US 8,165,864 B2
(45) Date of Patent: Apr. 24, 2012

(54) METHOD, SYSTEM AND COMPUTER PROGRAM PRODUCT FOR VERIFYING ADDRESS GENERATION, INTERLOCKS AND BYPASSES

(75) Inventors: Michael P. Mullen, Poughkeepsie, NY (US); Marvin J. Rich, Poughkeepsie, NY (US); James L. Schafer, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 856 days.

(21) Appl. No.: 12/028,038

(22) Filed: Feb. 8, 2008

(65) Prior Publication Data

US 2009/0204796 A1    Aug. 13, 2009

(51) Int. Cl.
*G06G 7/62* (2006.01)
*G06F 17/50* (2006.01)
*G06F 7/38* (2006.01)
*G06F 11/00* (2006.01)

(52) U.S. Cl. .............. 703/14; 703/17; 703/19; 712/227; 714/741

(58) Field of Classification Search .................... 703/13, 703/14, 17, 19; 712/218, 227; 714/10, 100, 714/741
See application file for complete search history.

(56) References Cited

U.S. PATENT DOCUMENTS

| | | | |
|---|---|---|---|
| 4,594,655 A * | 6/1986 | Hao et al. ....................... | 712/218 |
| 4,729,107 A | 3/1988 | Hasegawa et al. | |
| 4,903,196 A | 2/1990 | Pomerene et al. | |
| 5,465,334 A * | 11/1995 | Sato ................................ | 712/32 |
| 6,138,215 A | 10/2000 | Check et al. | |
| 6,209,076 B1 | 3/2001 | Blomgren | |
| 6,378,061 B1 * | 4/2002 | Carbine et al. ................. | 712/200 |
| 6,385,071 B1 | 5/2002 | Chai et al. | |
| 6,457,067 B1 | 9/2002 | Byers et al. | |
| 6,629,234 B1 * | 9/2003 | Col ................................. | 712/219 |
| 6,671,794 B1 | 12/2003 | Giami et al. | |
| 7,096,345 B1 * | 8/2006 | Chen et al. ..................... | 712/218 |
| 7,162,616 B2 * | 1/2007 | Biswas et al. .................. | 712/225 |
| 7,451,294 B2 * | 11/2008 | Sperber et al. ................. | 712/216 |
| 7,502,725 B2 * | 3/2009 | Lewis et al. .................... | 703/22 |
| 7,730,285 B1 * | 6/2010 | Chen et al. ..................... | 712/218 |
| 2005/0251379 A1 | 11/2005 | Lewis et al. | |

OTHER PUBLICATIONS

"Functional verification of the CMOS S/390 Parallel Enterprise Server G4 system". B. Wile, et al. IBM Research and Development, Jul./Sep. 1997.*

"The IBM eServer z990 microprocessor". T.J. Slegal et al. IBM Research and Development, May/Jul. 2004.*

(Continued)

*Primary Examiner* — Paul Rodriguez
*Assistant Examiner* — Nithya Janakiraman
(74) *Attorney, Agent, or Firm* — Cantor Colburn LLP; John Campbell

(57) ABSTRACT

Method, system and computer program product for verifying the address generation, address generation interlocks, and address generation bypassing controls in a CPU. An exemplary embodiment includes a verification method in a processor, the method including propagating a first set general purpose register values from a first instruction to a second instruction, wherein the simulation monitor is coupled to a first stage of the instruction pipeline, and wherein the first set of general purpose register values are stored in a simulation instruction object, selecting a second set of general purpose register values, updating the first set of general purpose register values with the second set of general purpose register values and placing the second set of general purpose register values on a bus.

25 Claims, 6 Drawing Sheets

OTHER PUBLICATIONS

"Functional verification of the z990 superscalar multibook microprocessor complex". D.G. Bair, et al. IBM Research and Development, May/Jul. 2004.*

"The Microarchitecture of the IBM eServer z900 processor" E.M. Schwarz et al. Jul./Sep. 2002.*

Driscoll et al., "Address Generate Interlock Avoidance for Branch Instructions in a Branch History Table Processor", IBM Technical Disclosure Bulletin, Jun. 1981, pp. 350-354.

z/Architecture Principles of Operation, International Business Machines Corporation, SA22-7832-05, Sixth Edition (Apr. 2007).

* cited by examiner

Sample Istream - Propagating GPR values and computing expected AGEN

Suppose the initial value of GPR1=12345678, and the istream is:

```
L    2,xxx(0,1)
A    2,yyy(0,2)
S    3,zzz(0,2)
```

At Disp stage for L, copy:      L.GPR1 = 12345678 (from preceding instr)
                                L.GPR2...L.GPR15 = (from preceding instr)               ← 601
At Disp stage for L, compute:   L.Expected_Agen = (GPR1+xxx = 12345678+xxx  ← 602
At Disp stage for L, assign:    L.GPR2 = 34259427 (new random data)  ← 603

At Disp stage for A, copy:      A.GPR1 = 12345678 (from preceding instr)
                                A.GPR2 = 34259427 (from preceding instr)
                                A.GPR3...A.GPR15 = (from preceding instr)
At Disp stage for A, compute:   A.Expected_Agen = (GPR2) + yyy = 34259427+yyy
At Disp stage for A, assign:    A.GPR2 = 65827129 (new random data)

At Disp stage for S, copy:      S.GPR1 = 12345678 (from preceding instr)
                                S.GPR2 = 65827129 (from preceding instr)
                                S.GPR3...S.GPR15 = (from preceding instr)
At Disp stage for S, compute:   S.Expected_Agen = (GPR2)+zzz = 65827129+zzz
At Disp stage for S, assign:    S.GPR3 = 87459324 (new random data)
```

METHOD, SYSTEM AND COMPUTER PROGRAM PRODUCT FOR VERIFYING ADDRESS GENERATION, INTERLOCKS AND BYPASSES

BACKGROUND OF THE INVENTION

This invention relates generally to hardware verification, and more particularly to a method, system and computer program product for verifying the address generation, address generation interlocks, and address generation bypassing controls in a CPU.

Address generation (AGEN), address generation interlocks (AGI) and address generation bypassing (AGEN Bypass) are complex functions sometimes implemented in the Instruction Dispatch Unit (IDU) of a CPU. Typically, verification of these functions is performed in unit simulation. For example, verification in unit simulation includes: 1) driving random data on the bypass buses from sending units (e.g. Fixed Point Unit (FXU)); 2) Predicting when AGI & AGEN Bypass are going to happen in the IDU; 3) capturing the bypass data, and storing that into a single (software) copy of the general purpose registers (GPRs); and 4) using the GPR copy to compute a predicted AGEN, to compare against the hardware AGEN result.

However, this approach has drawbacks including requiring effectively duplicating logic in the IDU (the design under test) in simulation code, to predict. AGI and AGEN Bypass, which is not desirable (logic errors can be duplicated & thus masked in the simulation code). In addition, the AGI and AGEN Bypass logic is complicated, and thus requires a lot of code and effort to implement and debug in simulation, including a lot of designer time in explaining the design and looking at false fails, and other time consuming operations.

BRIEF SUMMARY OF THE INVENTION

An exemplary embodiment includes a verification method in a processor, the method including propagating a first set general purpose register values from a first instruction to a second instruction, wherein the simulation monitor is coupled to a first stage of the instruction pipeline, and wherein the first set of general purpose register values are stored in a simulation instruction object, selecting a second set of general purpose register values, updating the first set of general purpose register values with the second set of general purpose register values and placing the second set of general purpose register values on a bus.

Another exemplary embodiment includes a verification method, including performing in a simulated instruction object: copying general purpose register values from a preceding instruction in a general purpose register set, performing AGEN operations on addresses in the pipeline that access the copy of the general purpose register values and writing to a subset of general purpose registers.

A further exemplary embodiment includes a processor, including an instruction pipeline, a simulation driver coupled to the instruction pipeline, a simulation monitor coupled to the instruction pipeline and a plurality of simulation instruction objects residing in the instruction pipeline, each of the plurality of simulation instruction objects including a set of general purpose registers, an expected AGEN result for addresses accessing the general, purpose registers and a pipeline stage of the instruction pipeline.

BRIEF DESCRIPTION OF THE DRAWINGS

Referring now to the drawings wherein like elements are numbered alike in the several FIGURES:

FIG. 6 illustrates one example of an actual instruction stream in simulation, along with the way the AGEN results are calculated for the expected results.

DETAILED DESCRIPTION OF EXEMPLARY EMBODIMENTS

In an exemplary embodiment, the systems and methods described herein retain a set of (software) GPRs with each instruction in a pipeline, and propagate GPR values from older to younger instructions. In an exemplary embodiment, AGEN results are computed for future instructions, without regard to whether an AGI or AGEN Bypass is needed.

Figure 1:
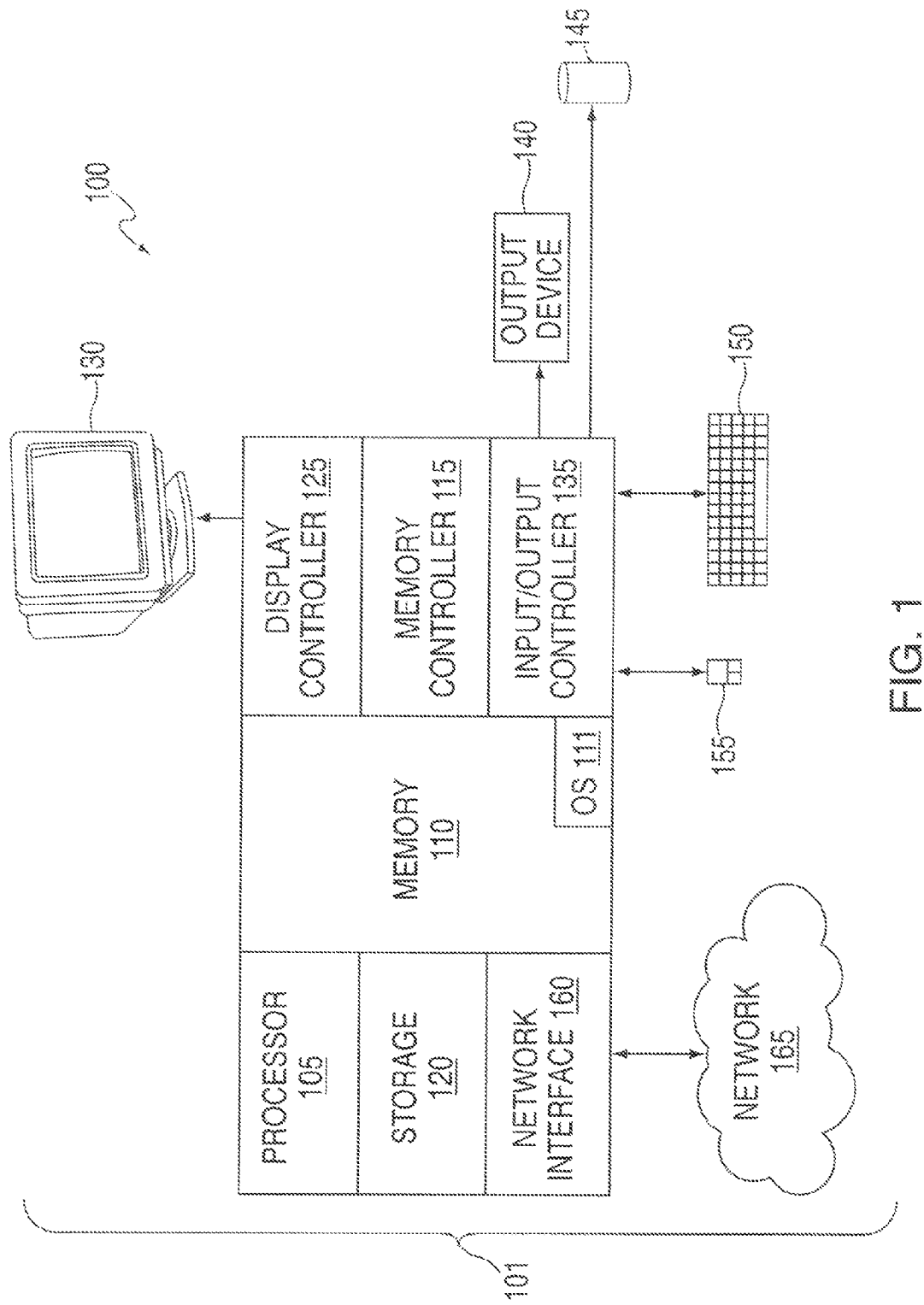
FIG. 1 illustrates an exemplary embodiment of a system for verifying the address generation, address generation, interlocks, and address generation bypassing controls in a CPU.

FIG. 1 illustrates an exemplary embodiment of a system 100 for verifying the address generation, address generation interlocks, and address generation bypassing controls in a CPU. The methods described herein can be implemented in software (e.g., firmware), hardware, or a combination thereof. In exemplary embodiments, the methods described herein are implemented in software, as an executable program, and is executed by a special, or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom, made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the verification methods described herein in accordance with exemplary embodiments and a suitable operating system (OS) 111. The operating system 111 essentially controls the execution of other computer programs, such the verification systems and methods described herein, and provides scheduling, input-output control, file and data management, memory management, and communication control and related services.

The verification methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the verification methods can he written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interlace card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The verification methods described herein and the OS 111, in whole or in part, but typically the latter, are read by the processor 105, perhaps buffered within the processor 105, and then executed.

When the systems and methods described herein are implemented in software, as is shown in FIG. 1, it the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The verification, methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner If necessary, and then stored in a computer memory.

In exemplary embodiments, where the verification methods are implemented in hardware, the verification methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 2:
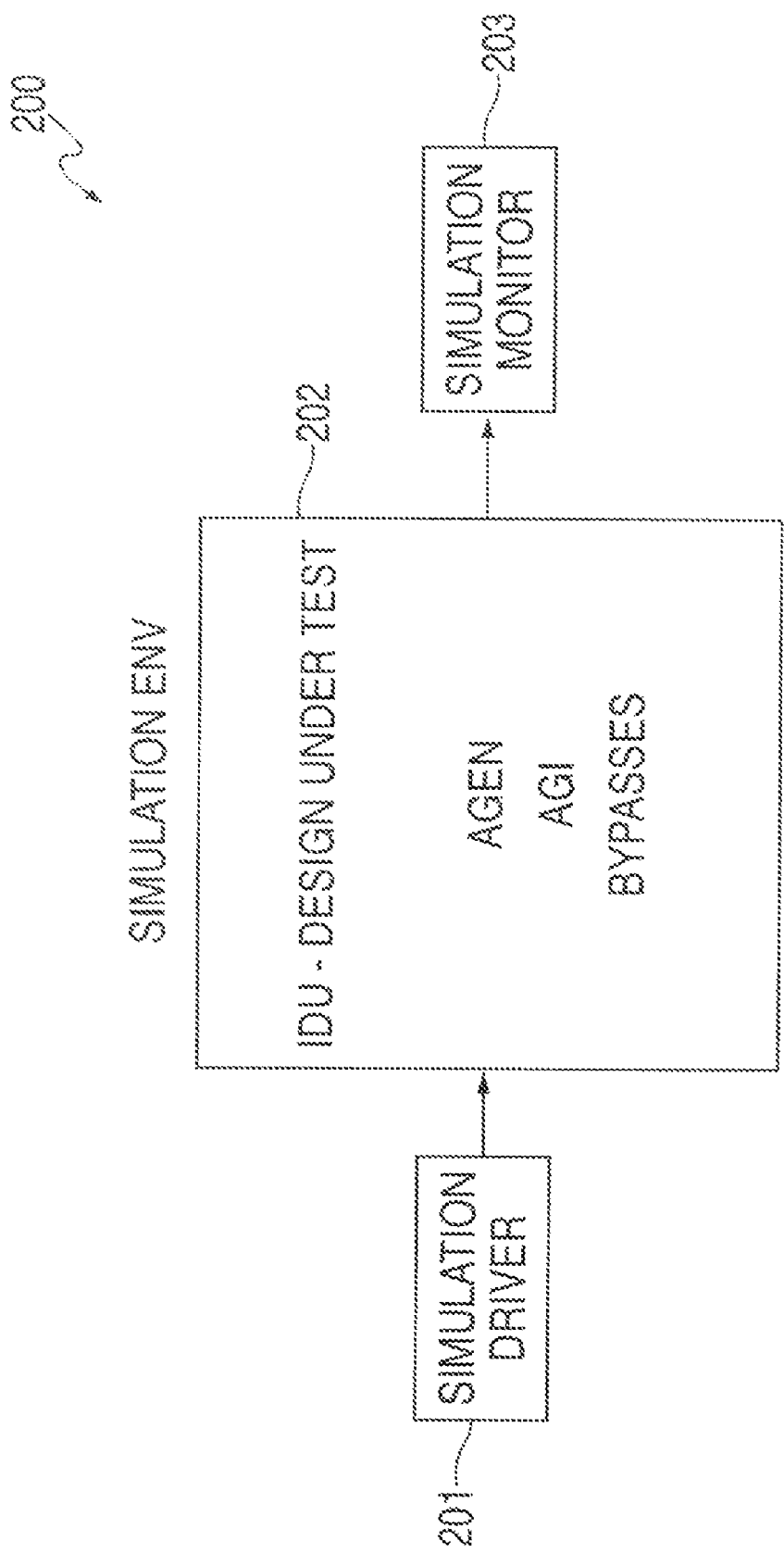
FIG. 2 illustrates one example of a simulation environment for a design under test which includes AGEN, AGI and AGEN Bypass logic.

FIG. 2 illustrates a block diagram of a simulation environment 200 that can include a simulation driver 201 coupled to a design under test 202 (e.g., the processor 105) coupled to a simulation monitor 203. In an exemplary embodiment, the simulation driver 201 is responsible for driving instructions into the IDU (Design under Test) 202, as well as driving execution results (new GPR values) from other execution units into IDU, The IDU includes the AGEN, AGI and AGEN Bypass logic that are to be verified, in an exemplary embodiment, the simulation monitor 203 checks the AGEN results on all possible cycles.

Figure 3:
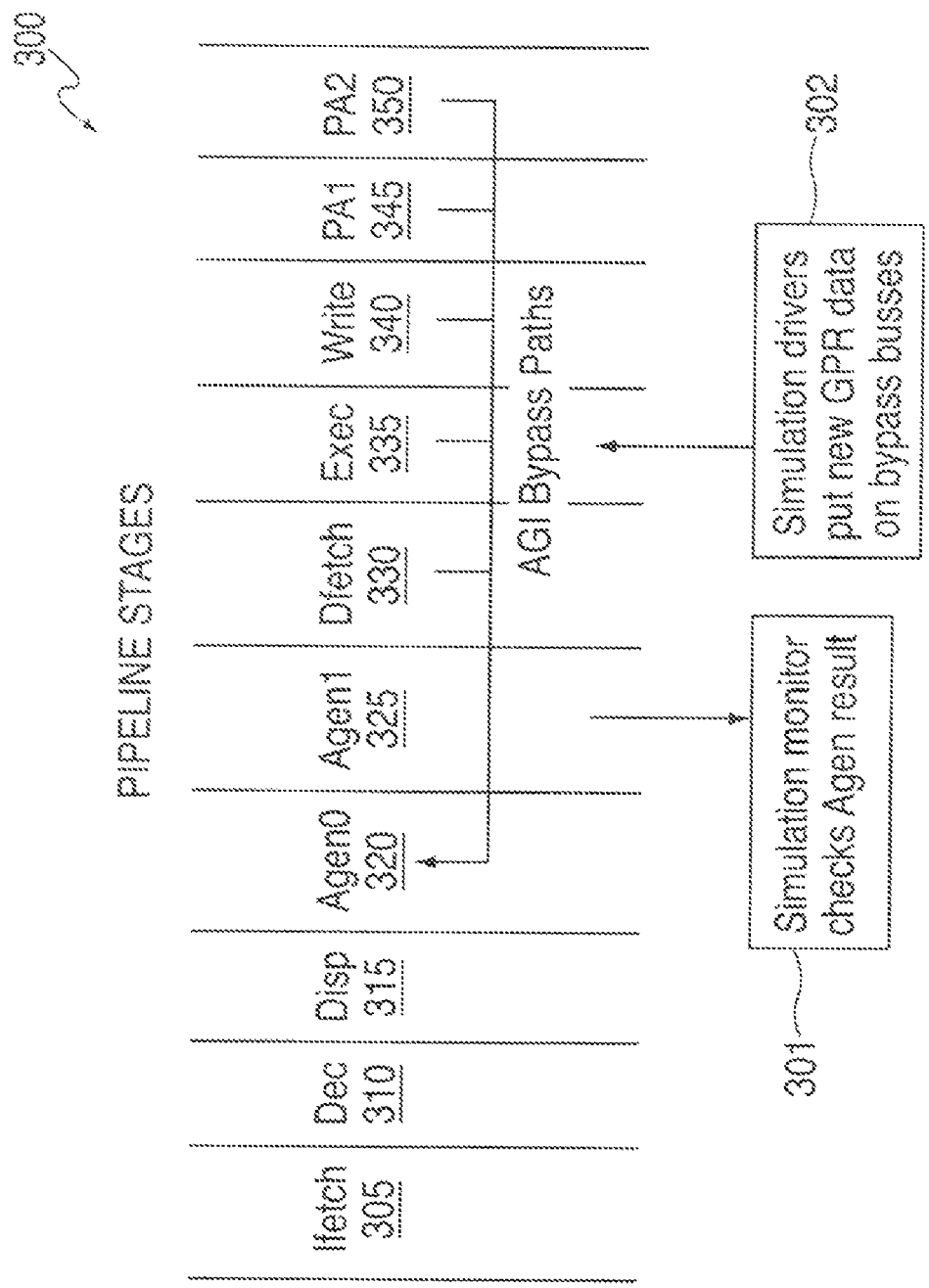
FIG. 3 illustrates one example of the pipeline stages of a CPU design which include AGEN, AGI and AGEN Bypass logic.

FIG. 3 illustrates a block diagram of a set of pipeline stages 300 for a CPU (e.g., the processor 105) in accordance with an exemplary embodiment. In an exemplary embodiment, the pipeline 300 can include stages including, but not limited to: Ifetch 305; Dee 310; Disp 315; Agen0 320; Agen1 325; Dfetch 330; Exec 335; Write 340; PA1 345; and PA2 350. In an exemplary embodiment, a simulation monitor 301 coupled to the pipeline 300, checks an AGEN result in the pipeline stages 300, the AGEN result denoted 'Agen1'. In an exemplary embodiment, if an instruction updates a GPR, a simulation driver 302 coupled to the pipeline stages 300 drives new GPR values on the AGEN Bypass (if allowed for the instruction) and execution result, buses in the appropriate cycles (pipeline stages).

Figure 4:
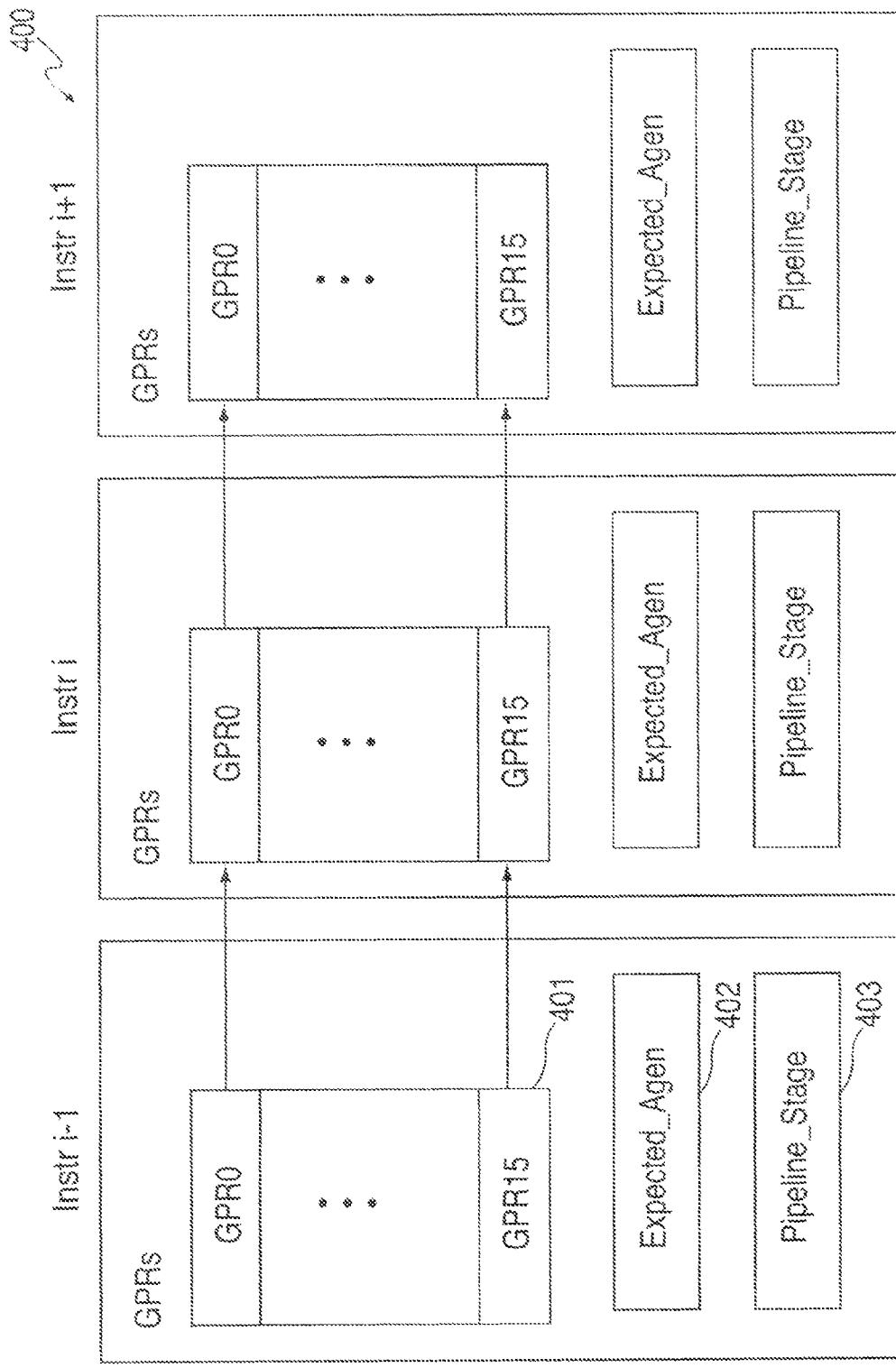
FIG. 4 illustrates one example of Simulation objects which include a set of GPRs for each instruction, along with expected AGEN results and the current pipe stage for each instruction.

FIG. 4 depicts a simulation instruction object diagram 400 representing an instruction in accordance with an exemplary embodiment. Each simulation instruction object contains a set of GPR values 401, an expected AGEN result 402, and a pipeline stage 403. In an exemplary embodiment, the GPR values are propagated from instruction (i–1) (oldest) to instruction (i) to instruction (i+1) (newest). In an exemplary embodiment, the expected AGEN result is computed once the GPR values are propagated in the Disp 315 pipeline stage (see FIG. 3), which is prior to the hardware design beginning the AGEN. In addition to checking the expected AGEN result, the simulation monitor 203, 301 is also responsible for propagating the GPR values from one instruction to the next, and keeping track of the pipeline stage for each instruction. In an exemplary embodiment, the simulation driver 201, 302 assigns new random values for GPRs for instructions that update GPRs, after the GPR values have been propagated from the prior instruction. The new random values are saved in the simulation instruction object, and are used by the simulation driver 201, 302 to drive the AGEN Bypass and execution result buses in the appropriate pipeline stages.

Figure 5:
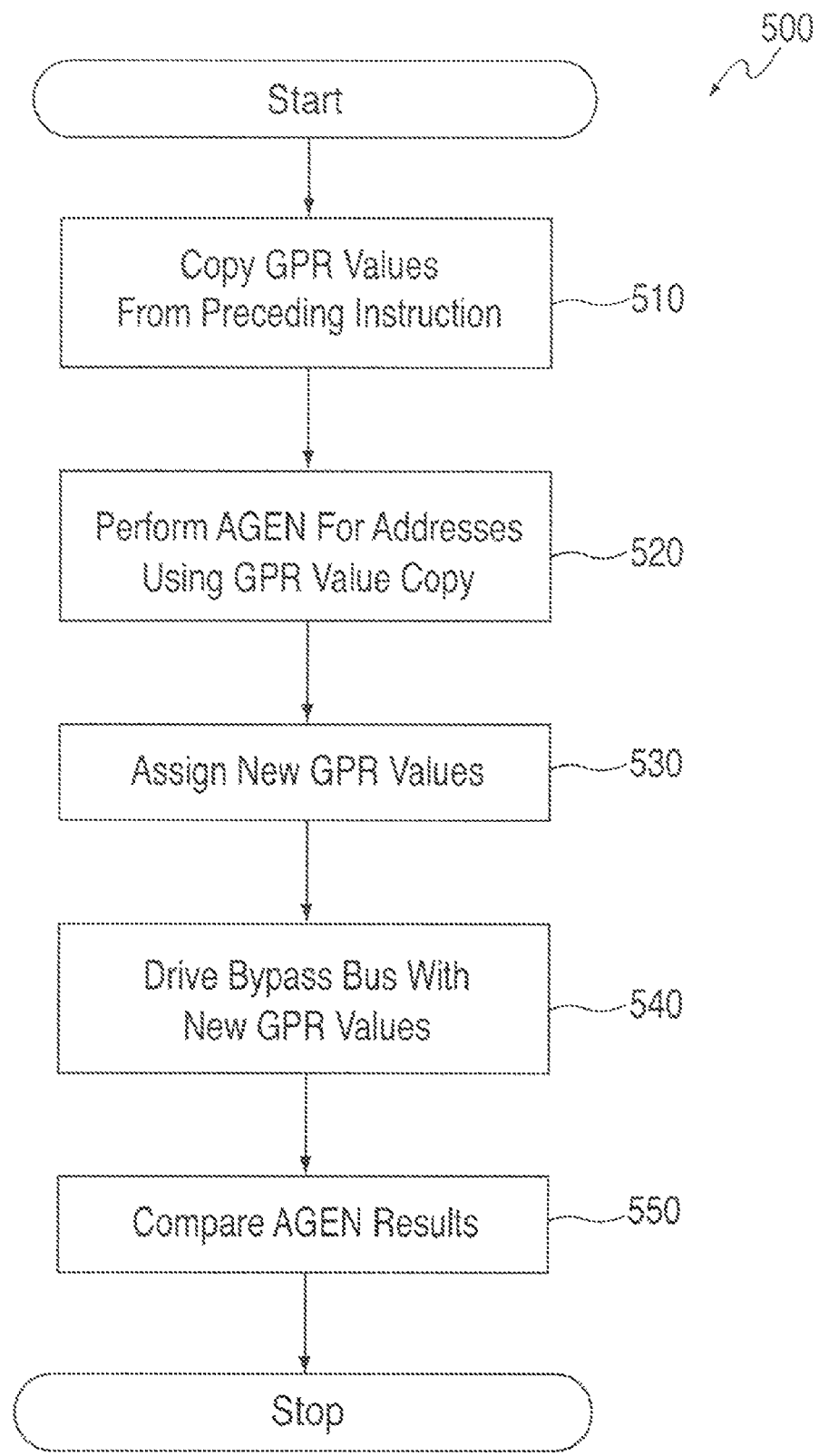
FIG. 5 illustrates a method for verifying the address generation, address generation interlocks, and address generation bypassing controls in a CPU in accordance with exemplary embodiments.

FIG. 5 illustrates a method 500 for verifying the address generation, address generation interlocks, and address generation bypassing controls in a CPU in accordance with exemplary embodiments. As described above, in an exemplary embodiment each instruction in the instruction pipeline includes a simulated instruction object having a full set of GPRs (or Milli-GPRs), an expected AGEN result, and a pipeline stage. As each instruction in the pipeline is dispatched through the pipeline, at block 510, the simulated instruction object copies all the GPR values from the preceding instruction into the instruction's GPR set. At block 520 the simulated instruction object performs AGEN for any addresses in the pipeline that are using the instruction's GPR copy, and then saves the expected AGEN result for a later comparison. At block 530, for any GPRs that the instruction writes, the simulated instruction object assigns new random GPR values in its own GPR set. The simulation driver 201, 302 then drives the bypass buses from any sending units with the new GPR values, at block 540. The simulation monitor 203, 301 compares the actual AGEN result with the expected AGEN results at block 550. As discussed above, the method 500 ensures that the AGEN results can always be predicted for an instruction based on GPR values from prior instructions, without knowing whether or not an AGI or AGI bypass is going to occur.

Therefore, it is appreciated that as each instruction, J, at a dispatch time, full knowledge of all GPR values are known from the preceding instruction J-1. Therefore, checking for the correct AGEN result for J is determined from the GPR values associated with the instruction object associated with the preceding instruction J-1 (i.e., to compute the expected AGEN result).

FIG. 6 illustrates a sample instruction stream 600 in accordance with exemplary embodiments. As illustrated, the instruction stream 600 illustrates the propagation of GPRs from one instruction to the next instruction. In addition, the instruction stream illustrates assignment of new random GPR values. The instruction stream 600 further illustrates computation of the expected AGEN result. In particular, in 601, the GPR values for the L instruction are propagated from the preceding instruction. The expected AGEN result is then computed using those propagated values in 602. Finally, since the L instruction updates a GPR, a new random value for the GPR is chosen in 603. All of these actions are performed in the Disp 315 pipeline stage for the L instruction—that is prior to the first AGEN cycle. In an exemplary embodiment, as the L instruction progresses through the pipeline 300, the simulation driver 201, 302 puts the new value of GPR2 on the bypass buses and final execution result bus in the appropriate pipeline 300 stages. The IDU may or may not choose to accept the bypass data. In an exemplary embodiment, from a verification perspective the IDU choosing or not choosing the bypass data is not critical. For any instruction, the expected AGEN result is the correct AGEN result, without regard to whether or not there is an AGI or AGEN Bypass. The AGEN result can be checked in any cycle that it's needed (e.g. Agen1 325).

In an exemplary embodiment, the systems and methods described herein can also be applied to the Millicode mode; the Instruction Simulation Object is extended to include Milli-GPRs, and those values are propagated from instruction to instruction. The Milli-GPRs are then used to compute the expected AGEN result.

Technical effects and benefits include verification of AGEN, AGI, and AGEN Bypass hardware by treating the design under test as a 'black box', and not having to duplicate any of the hardware logic in our simulation code to predict AGI and AGEN Bypass.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also he embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without, departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. In a processor simulator for simulating a processor having an instruction pipeline and an address generation (AGEN) bypass-bus, a verification method, comprising:
   propagating a first set of general purpose register values from a first instruction to a second instruction, wherein a simulation monitor is coupled to a simulated first stage of the instruction pipeline, and wherein the first set of general purpose register values are stored in a simulation instruction object, wherein the AGEN bypass-bus is simulated in the simulation monitor and wherein AGEN results are sent by way of the simulated AGEN bypass bus to the instruction pipeline;
   in response to a computation of an expected AGEN result in the simulated instruction object, selecting a second set of general purpose register values;
   updating the first set of general purpose register values with the second set of general purpose register values; and
   placing the second set of general purpose register values on a simulated bus,
   wherein at a dispatch time of the second instruction in the pipeline, general purpose register values for the first instruction are known, wherein an AGEN result for the second instruction is determined from the general purpose register values associated with an instruction object associated with the first instruction, the determining independent of whether at least one of address generation interlock (AGI) and AGI bypass occurs.

2. The method as claimed in claim 1 wherein a simulation driver places the second set of general purpose register values on the simulated AGEN bypass-bus.

3. The method as claimed in claim 1 wherein the simulation driver places a second set of general purpose register values on an execution result bus coupled to the processor.

4. The method as claimed in claim 1 wherein the simulation instruction object includes a pipeline stage associated with the expected AGEN value and the first set of general purpose register values.

5. The method as claimed in claim 4 wherein the simulation driver places the second set of general purpose register values on the simulated bus in response to the second instruction propagated in the pipeline stage associated with the expected AGEN value.

6. The method as claimed in claim 1 wherein the first set general purpose register values are propagated from the first instruction to the second instruction prior to a microprocessor AGEN cycle.

7. The method as claimed in claim 6 further comprising the simulation monitor comparing the expected AGEN result with an actual hardware AGEN result generated by the microprocessor AGEN cycle.

8. The method as claimed in claim 6 wherein the first set general purpose register values are propagated from the first instruction to the second instruction in a Dispatch stage of the instruction pipeline.

9. A verification method for a processor model, comprising:
   for each instruction in a processor pipeline, performing in a simulated instruction object:
   copying general purpose register values from a preceding instruction in a general purpose register set;
   performing address generation (AGEN) operations from a simulation monitor that includes a simulated AGEN bypass-bus on addresses in the pipeline that access the copy of the general purpose register values;
   writing to a subset of general purpose registers,
   wherein at a dispatch time of a second instruction in the pipeline, general purpose register values for a first instruction are known, wherein an AGEN result for the second instruction is determined from the general purpose register values associated with an instruction object associated with the first instruction, the determining independent of whether at least one of address generation interlock (AGI) and AGI bypass occurs.

10. The method as claimed in claim 9 further comprising:
    for each of the subset of general purpose registers:
    assigning new random general purpose register values to the general purpose register set.

11. The method as claimed in claim 10 further comprising driving a bypass bus from a sending unit with the new random general purpose register values.

12. The method as claimed in claim 11 wherein a simulation driver coupled to the simulated instruction object drives the bypass bus from the sending unit with the new random general purpose register values.

13. The method as claimed in claim 9 further comprising saving an expected AGEN result.

14. The method as claimed in claim 13 further comprising comparing an actual AGEN result with the expected AGEN result.

15. The method as claimed in claim 14 wherein a simulation monitor coupled to the simulated instruction object compares the actual AGEN result with the expected AGEN result.

16. A method for simulating a processor, comprising:
    simulating an instruction pipeline;
    simulating a simulation driver coupled to the instruction pipeline;
    simulating a simulation monitor coupled to the instruction pipeline; and
    simulating a plurality of simulation instruction objects residing in the instruction pipeline, each of the plurality of simulation instruction objects including:
    a set of general purpose registers;
    an expected address generation (AGEN) result from a simulated AGEN bypass-bus residing in the simulation monitor for addresses accessing the general purpose registers; and
    a pipeline stage of the instruction pipeline
    wherein at a dispatch time of a second instruction in the pipeline, general purpose register values for a first instruction are known, wherein an AGEN result for the second instruction is determined from the general purpose register values associated with an instruction object associated with the first instruction, the determining independent of whether at least one of address generation interlock (AGI) and AGI bypass occurs.

17. The method as claimed in claim 16 wherein the simulation monitor is configured to propagate a first set of general purpose register values from a first instruction to a second instruction in the instruction pipeline, prior to a processor AGEN cycle.

18. The method as claimed in claim 17 wherein the simulation driver is configured to select a second set of general purpose register values for instructions in the instruction pipeline that update the set of general purpose registers after the expected AGEN result is computed.

19. The method as claimed in claim 18 wherein the simulation driver is configured to a second set of general purpose register values on a processor bus.

20. The method as claimed in claim 19 wherein the simulation monitor is further configured to compare the expected AGEN result with an actual AGEN result in an associated stage of the instruction pipeline.

21. A computer program product for simulating a processor having an instruction pipeline and an address generation (AGEN) bypass bus, the computer program product including a non-transitory computer readable medium storing instructions for causing a computer to implement a verification method, the verification method comprising:
propagating a first set of general purpose register values from a first instruction to a second instruction, wherein a simulation monitor is coupled to a simulated first stage of the instruction pipeline, and wherein the first set of general purpose register values are stored in a simulation instruction object, wherein the AGEN bypass bus is simulated in the simulation monitor and wherein AGEN results are sent by way of the simulated AGEN bypass bus to the instruction pipeline;
in response to a computation of an expected AGEN result in the simulated instruction object, selecting a second set of general purpose register values;
updating the first set of general purpose register values with the second set of general purpose register values; and
placing the second set of general purpose register values on a simulated bus,
wherein at a dispatch time of the second instruction in the pipeline, general purpose register values for the first instruction are known, wherein an AGEN result for the second instruction is determined from the general purpose register values associated with an instruction object associated with the first instruction, the determining independent of whether at least one of address generation interlock (AGI) and AGI bypass occurs.

22. A computer program product for simulating a processor, the computer program product including a non-transitory computer readable medium storing instructions for causing a computer to implement a method, the method comprising:
simulating an instruction pipeline;
simulating a simulation driver coupled to the instruction pipeline;
simulating a simulation monitor coupled to the instruction pipeline; and
simulating a plurality of simulation instruction objects residing in the instruction pipeline, each of the plurality of simulation instruction objects including:
a set of general purpose registers;
an expected address generation (AGEN) result from a simulated AGEN bypass-bus residing in the simulation monitor for addresses accessing the general purpose registers; and
a pipeline stage of the instruction pipeline,
wherein at a dispatch time of a second instruction in the pipeline, general purpose register values for a first instruction are known, an AGEN result for the second instruction is determined from the general purpose register values associated with an instruction object associated with the first instruction, the determining independent of whether at least one of address generation interlock (AGI) and AGI bypass occurs.

23. The computer program product as claimed in claim 22 wherein the simulation monitor is configured to propagate a first set of general purpose register values from a first instruction to a second instruction in the instruction pipeline, prior to a processor AGEN cycle.

24. The computer program product as claimed in claim 23 wherein the simulation driver is configured to select a second set of general purpose register values for instructions in the instruction pipeline that update the set of general purpose registers after the expected AGEN result is computed.

25. The computer program product as claimed in claim 24 wherein the simulation driver is configured to second set of general purpose register values on a processor bus.

* * * * *